(12) United States Patent
Schuisky et al.

(10) Patent No.: US 9,979,030 B2
(45) Date of Patent: May 22, 2018

(54) STRIP PRODUCT FORMING A SURFACE COATING OF PEROVSKITE OR SPINEL FOR ELECTRICAL CONTACTS

(71) Applicant: Sandvik Intellectual Property AB, Sandviken (SE)

(72) Inventors: Mikael Schuisky, Sandviken (SE); Finn Petersen, Roskilde (DK); Niels Christiansen, Gentofte (DK); Joergen Gutzon Larsen, Bagsvaerd (DK); Soeren Linderoth, Roskilde (DK); Lars Mikkelsen, Roskilde (DK)

(73) Assignee: Sandvik Intellectual Property AB, Sandviken (SE)

( * ) Notice: Subject to any disclaimer, the term of this patent is extended or adjusted under 35 U.S.C. 154(b) by 973 days.

(21) Appl. No.: 14/327,780

(22) Filed: Jul. 10, 2014

(65) Prior Publication Data

US 2015/0079498 A1 Mar. 19, 2015

Related U.S. Application Data

(63) Continuation of application No. 11/791,321, filed as application No. PCT/SE2005/001747 on Nov. 21, 2005, now Pat. No. 8,846,211.

(30) Foreign Application Priority Data

Nov. 30, 2004 (SE) ........................ 0402936

(51) Int. Cl.
| | |
|---|---|
| *B32B 15/00* | (2006.01) |
| *B32B 15/04* | (2006.01) |
| *B32B 15/18* | (2006.01) |
| *B05D 5/12* | (2006.01) |
| *H01M 8/02* | (2016.01) |
| *H01M 8/12* | (2016.01) |

(Continued)

(52) U.S. Cl.
CPC ......... *H01M 8/0245* (2013.01); *B32B 15/013* (2013.01); *C23C 8/02* (2013.01);
(Continued)

(58) Field of Classification Search
CPC ........... C23C 8/02; C23C 10/60; C23C 26/00; C23C 10/52; C23C 28/00; C23C 28/02;
(Continued)

(56) References Cited

U.S. PATENT DOCUMENTS

| | | | |
|---|---|---|---|
| 4,950,562 A | 8/1990 | Yoshida et al. | |
| 5,021,304 A | 6/1991 | Ruka et al. | |

(Continued)

FOREIGN PATENT DOCUMENTS

| | | |
|---|---|---|
| DE | 19547699 C2 | 7/1997 |
| DE | 19627504 C1 | 10/1997 |

(Continued)

OTHER PUBLICATIONS

Appolloni et al., "New Grade in TKL-AST of High-Nitrogen Austenitic Stainless Steels (HNASS)," paper presented to 6th European Stainless Steel Conference, Jun. 10-13, 2008, Helsinki, Finland: pp. 373-379.

(Continued)

*Primary Examiner* — Michael E. La Villa
(74) *Attorney, Agent, or Firm* — Morgan, Lewis & Bockius LLP

(57) ABSTRACT

A strip product consists of a metallic substrate, such as stainless steel, and a coating, which in turn comprises at least one metallic layer and one reactive layer. The coated strip product is produced by providing the different layers, preferably by coating, and thereafter oxidizing the coating to accomplish a conductive surface layer comprising perovskite and/or spinel structure.

19 Claims, 3 Drawing Sheets

(51) Int. Cl.
H01M 8/0245 (2016.01)
C23C 28/00 (2006.01)
C23C 28/02 (2006.01)
C23C 30/00 (2006.01)
B32B 15/01 (2006.01)
C23C 8/02 (2006.01)
C23C 10/52 (2006.01)
C23C 10/60 (2006.01)
C23C 26/00 (2006.01)
H01M 8/0206 (2016.01)
H01M 8/021 (2016.01)
H01M 8/0217 (2016.01)
H01M 8/0228 (2016.01)
H01R 13/03 (2006.01)
H01M 8/0232 (2016.01)
H01M 8/1246 (2016.01)
H01M 8/124 (2016.01)

(52) U.S. Cl.
CPC .............. C23C 10/52 (2013.01); C23C 10/60 (2013.01); C23C 26/00 (2013.01); C23C 28/00 (2013.01); C23C 28/02 (2013.01); C23C 28/021 (2013.01); C23C 28/023 (2013.01); C23C 28/40 (2013.01); C23C 28/42 (2013.01); C23C 30/00 (2013.01); C23C 30/005 (2013.01); H01M 8/021 (2013.01); H01M 8/0206 (2013.01); H01M 8/0217 (2013.01); H01M 8/0228 (2013.01); H01M 8/0232 (2013.01); H01M 8/1246 (2013.01); H01R 13/03 (2013.01); H01M 2008/1293 (2013.01); Y02E 60/50 (2013.01); Y10T 428/1259 (2015.01); Y10T 428/12493 (2015.01); Y10T 428/12632 (2015.01); Y10T 428/12778 (2015.01); Y10T 428/12806 (2015.01); Y10T 428/12847 (2015.01); Y10T 428/12854 (2015.01); Y10T 428/12931 (2015.01); Y10T 428/12937 (2015.01); Y10T 428/12951 (2015.01); Y10T 428/12972 (2015.01); Y10T 428/12979 (2015.01); Y10T 428/2495 (2015.01); Y10T 428/24967 (2015.01); Y10T 428/24975 (2015.01)

(58) Field of Classification Search
CPC ..... C23C 28/021; C23C 28/023; C23C 28/40; C23C 28/42; C23C 30/00; C23C 30/005; Y10T 428/12493; Y10T 428/1259; Y10T 428/12854; Y10T 428/12931; Y10T 428/12847; Y10T 428/12979; Y10T 428/12937; Y10T 428/2495; Y10T 428/12806; Y10T 428/24975; Y10T 428/12951; Y10T 428/12972; Y10T 428/12778; Y10T 428/12632; Y10T 428/24967; H01M 8/0206; H01M 8/021; H01M 8/0217; H01M 8/0228; H01M 8/0232; H01M 8/0245; H01M 8/1246; H01M 2008/1293; H01R 13/03; B32B 15/013; Y02E 60/50
See application file for complete search history.

(56) References Cited

U.S. PATENT DOCUMENTS

| 5,942,349 | A | 8/1999 | Badwal et al. |
|---|---|---|---|
| 6,054,231 | A | 4/2000 | Virkar et al. |
| 6,074,772 | A | 6/2000 | Hofer et al. |
| 6,821,656 | B2 * | 11/2004 | Dietrich .................. B64G 1/58 416/241 B |
| 6,936,217 | B2 | 8/2005 | Quadadakkers et al. |
| 7,390,582 | B2 | 6/2008 | Tietz et al. |
| 2002/0094465 | A1 | 7/2002 | Fleck et al. |
| 2002/0132142 | A1 | 9/2002 | Windisch, Jr. et al. |
| 2003/0059335 | A1 | 3/2003 | Quadadakkers et al. |
| 2003/0102061 | A1 | 6/2003 | Spiegel et al. |
| 2003/0218870 | A1 | 11/2003 | Fisher et al. |
| 2004/0058205 | A1 | 3/2004 | Mantese et al. |
| 2004/0224193 | A1 | 11/2004 | Mitlitsky et al. |
| 2006/0193971 | A1 | 8/2006 | Tietz et al. |
| 2008/0299417 | A1 | 12/2008 | Schuisky et al. |
| 2009/0029187 | A1 | 1/2009 | Schuisky et al. |

FOREIGN PATENT DOCUMENTS

| DE | 10025108 A1 | 11/2001 |
|---|---|---|
| DE | 10306647 A1 | 9/2004 |
| DE | 10306649 A1 | 9/2004 |
| EP | 0338823 A1 | 10/1989 |
| EP | 1298228 A2 | 4/2003 |
| GB | 2007712 A | 11/1978 |
| JP | 05-290863 A | 11/1993 |
| JP | 11-501764 A | 2/1999 |
| KR | 1990-0015373 A | 10/1990 |
| KR | 2003-0052106 A | 6/2003 |
| WO | 96/28855 A1 | 9/1996 |

OTHER PUBLICATIONS

Charles et al., "A New European 200 Series Standard to Substitute 304 Austenitics?" Proceedings, 6th European Stainless Steel Science and Market Conference, Helsinki, Jernkontoret, 2008: pp. 427-436.
Van Hecke, "17-4Mn: an alternative to grade 304," Stainless Steel World, Sep. 2008 (4 pages).
Vermoolen, "Science and Market," 6th European Stainless Steel Conference, Jun. 10-13, 2008, Helsinki, Finland (2 pages).
Uehara et al., Development of Ferritic Fe—Cr alloy for SOFC Separator, in Proceedings Fifth European Solid Oxide Fuel Cell Forum, Lucerne, Switzerland, Ed. J. Huijsmans (2002), pp. 281-288.
Friehling et al., Evaluation of Ferrite Stainless Steels as Interconnects in SOFC Stacks, in Proceedings Fifth European Solid Oxide Fuel Cell Forum, Lucerne, Switzerland, Ed. J. Huijsmans (2002), pp. 855-860.
Office Action for European Patent Application No. 05804297.9 dated Aug. 8, 2011.
Notification of the First Office Action for Chinese Patent Application No. 200580041004.3 dated Aug. 30, 2010.
Notification of the Third Office Action for Chinese Patent Application No. 200580041004.3 dated Dec. 23, 2011.
Office Action for Canadian Patent Application No. 2,584,355 dated Feb. 27, 2012.
Office Action for Australian Patent Application No. 2005310323 dated Sep. 25, 2009.
Second Office Action for Australian Patent Application No. 2005310323 dated Jun. 4, 2010.
Notice of Reasons for Rejection for Japanese Patent Application No. 2007-544303 dated Oct. 11, 2011.
Notice of Reasons for Rejection for Japanese Patent Application No. 2007-542977 dated Jan. 24, 2012.
Notice of Reasons for Rejection for Japanese Patent Application No. 2007-544303 dated Oct. 2, 2012.
Office Action for Korean Patent Application No. 2007-7012249 dated May 24, 2012.
Office Action for Korean Patent Application No. 2007-7012250 dated Jul. 24, 2012.
Office Action for Swedish Patent Application No. 0402935-1 dated May 20, 2005.
Office Action for U.S. Appl. No. 111665,972 dated Jan. 24, 2011.
Final Office Action for U.S. Appl. No. 11/665,972 dated Aug. 17, 2011.

(56) References Cited

OTHER PUBLICATIONS

Advisory Action for U.S. Appl. No. 11/665,972 dated Jan. 11, 2012.
Office Action for U.S. Appl. No. 11/665,972 dated Feb. 28, 2012.
Final Office Action for U.S. Appl. No. 11/665,972 dated Sep. 27, 2012.
Office Action for U.S. Appl. No. 11/665,972 dated Mar. 28, 2013.
European Search Report for European Patent Application No. 05807277.8 dated Dec. 7, 2010.
Office Action for European Patent Application No. 05804297.9 dated Apr. 22, 2010.
Extended European Search Report for European Patent Application No. 05804297.9 dated Aug. 3, 2009.
Extended European Search Report for European Patent Application No. 05807277.8 dated Apr. 13, 2010, 7 pages.
Office Action for Chinese Patent Application No. 200580041005.8 dated Feb. 11, 2011, 12 pages.
Office Action for European Application No. 05 807 277.8-1373 dated Mar. 9, 2016.

\* cited by examiner

STRIP PRODUCT FORMING A SURFACE COATING OF PEROVSKITE OR SPINEL FOR ELECTRICAL CONTACTS

RELATED APPLICATION DATA

This application is a continuation application of U.S. patent application Ser. No. 11/791,321 filed Feb. 21, 2008, which is a national stage application of International Application No. PCT/SE05/01747 filed Nov. 21, 2005, which claims priority under 37 U.S.C. § 119 to Swedish Application No. 0402936-9, filed Nov. 30, 2004, the entire contents of each of these applications is incorporated by reference.

FIELD OF THE DISCLOSURE

The present disclosure relates to a strip product to be used for manufacturing of electrical contacts, especially for use at high temperatures and in corrosive environments. The strip product consists of a metallic substrate, such as stainless steel, and a coating, which in turn comprises at least one metallic layer and one reactive layer. The coated strip product is produced by depositing the different layers and thereafter oxidising the coating to accomplish a conductive surface layer comprising perovskite and/or spinel structure.

BACKGROUND

Electrical contacts are used in a large variety of environments. Several factors may affect the electrical contact. One example of a factor that may greatly affect the electrical contact is a corrosive environment. If the contact material is corroded, for example by oxidation, the contact resistance is usually affected negatively. Corrosion products, like for example electrically insulating oxides or other insulating compounds, lower the surface conductivity of the contact. This in turn results in a lower efficiency of the component of which the electrical contact makes a part.

Another example of a factor that affects the material of an electrical contact is the temperature. The contact may suffer from insufficient mechanical strength or may even weld together due to high temperature. Also, wear may affect the properties of the electrical contact. Furthermore, differences in thermal expansion between different elements in an electrical device may cause thermal stress between the contact material and its adjacent elements, especially if the contact is exposed to thermal cycling.

Naturally, high temperature in combination with a corrosive environment can have an even more detrimental effect on the surface conductivity of the contact material.

Examples of where electrical contact materials may experience high corrosivity and high temperatures are in spark plugs, electrodes, waste, coal or peat fired boilers, in melting furnaces, in vehicles (especially close to the engine), or in industrial environments etc.

Another example of an electrical contact, which is used at high temperatures and in a corrosive environment, is interconnects for fuel cells, especially Solid Oxide Fuel Cells (SOFC). The interconnect material used in fuel cells should work as both separator plate between the fuel side and the oxygen/air side as well as current collector of the fuel cell. For an interconnect material to be a good separator plate the material has to be dense to avoid gas diffusion through the material and to be a good current collector the interconnect material has to be electrically conducting and should not form insulating oxide scales on its surfaces.

Interconnects can be made of for example graphite, ceramics or metals, often stainless steel. For instance, ferritic chromium steels are used as interconnect material in SOFC, which the two following articles are examples of: "Evaluation of Ferrite Stainless Steels as Interconnects in SOFC Stacks" by P. B. Friehling and S. Linderoth in the Proceedings Fifth European Solid Oxide Fuel Cell Forum, Lucerne, Switzerland, edited by J. Huijsmans (2002) p. 855; "Development of Ferritic Fe—Cr Alloy for SOFC separator" by T. Uehara, T. Ohno & A. Toji in the Proceedings Fifth European Solid Oxide Fuel Cell Forum, Lucerne, Switzerland, edited by J. Huijsmans (2002) p. 281.

In a SOFC application the thermal expansion of the interconnect material must not deviate greatly from the thermal expansion of the electro-active ceramic materials used as anode, electrolyte and cathode in the fuel cell stack. Ferritic chromium steels are highly suitable materials for this application, since the thermal expansion coefficients (TEC) of ferritic steels are close to the TECs of the electro-active ceramic materials used in the fuel cell.

An electrical contact material used as interconnect in a fuel cell will be exposed to oxidation during operation. Especially in the case of SOFC, this oxidation may be detrimental for the fuel cell efficiency and lifetime of the fuel cell. For example, the oxide scale formed on the surface of the interconnect material may grow thick and may even flake off or crack due to thermal cycling. Therefore, the oxide scale should have a good adhesion to the interconnect material. Furthermore, the formed oxide scale should also have good electrical conductivity and not grow too thick, since thicker oxide scales will lead to an increased internal resistance. The formed oxide scale should also be chemically resistant to the gases used as fuels in a SOFC, i.e., no volatile metal-containing species such as chromium oxyhydroxides should be formed. Volatile compounds such as chromium oxyhydroxide will contaminate the electro-active ceramic materials in a SOFC stack, which in turn will lead to a decrease in the efficiency of the fuel cell. Furthermore, in the case the interconnect is made out of stainless steel, there is a risk for chromium depletion of the steel during the lifetime of the fuel cell due to diffusion of chromium from the centre of the steel to the formed chromium oxide scale at its surface.

One disadvantage with the use of commercial ferritic chromium steel as interconnect in SOFC is that they usually are alloyed with small amounts of aluminum and/or silicon, which will form $Al_2O_3$ and $SiO_2$, respectively, at the working temperature of the SOFC. These oxides are both insulating, which will increase the electrical resistance of the cell, which in turn will lead to a lowering of the fuel cell efficiency.

One solution to the problems that arise when using ferritic steels as interconnect material for SOFC are the use of ferritic steels with very low amounts of Si and Al in order to avoid the formation of insulating oxide layers. These steels are usually also alloyed with manganese and rare earth metals such as La. This has for instance been done in patent application US 2003/0059335, where the steel is alloyed (by weight) with Mn 0.2-1.0%, La 0.01-0.4%, Al less than 0.2% and Si less than 0.2%. Another example is in patent application EP 1 298 228 A2 where the steel is alloyed (by weight) with Mn less 1.0%, Si less 1.0%, Al less 1.0%, along with Y less 0.5%, and/or rare earth metals (REM) less 0.2%.

In patent application U.S. Pat. No. 6,054,231 a superalloy, defined as a austenitic stainless steel, alloys of nickel and chromium, nickel based alloys or cobalt based alloys, is first coated with either Mn, Mg or Zn and then with a thick layer, 25 to 125 µm of an additional metal from the group Cu, Fe, Ni, Ag, Au, Pt, Pd, Ir or Rh. The coating of a thick second layer of an expensive metal such as Ni, Ag or Au is not a cost productive way of protecting already relatively expensive base materials such as superalloys.

US2004/0058205 describes metal alloys, used as electrical contacts, which when oxidised forms a highly conductive surface. These alloys can be applied onto a substrate, such as steel. The conducting surface is accomplished by doping of one metal, such as Ti, with another metal, such as Nb or Ta. Furthermore, the alloys according to US2004/0058205 are applied onto the surface in one step and thereafter oxidised.

None of the cited prior art provides a satisfactory electrical contact material for use in corrosive environments and/or at high temperatures which is produced in a cost-effective manner and with a high possibility of controlling the quality of the conductive surface.

Therefore, it is a primary object to provide a strip material with a low surface resistance and that is corrosion resistant, to be used in an electrical contact.

Another object is to provide a material, which will maintain its properties during operation for long service lives, to be used in electrical contacts.

A further object is to provide material that has a good mechanical strength, even at high temperatures, to be used as electrical contacts in corrosive environments.

Another object is to provide a cost-effective material for electrical contacts.

SUMMARY

A strip substrate of a metallic material, preferably stainless steel, more preferably ferritic chromium steel, is provided with a coating comprising at least one layer of a metallic material and at least one reactive layer. In this context a reactive layer is considered to mean a layer, which consists of at least one element or compound which forms a spinel and/or a perovskite structure with the metallic material of the first layer when oxidised.

The strip substrate may be provided with a coating by any method resulting in a dense and adherent coating. Coating methods may include vapour deposition, such as PVD, in a continuous roll-to-roll process. Thereafter, electrical contacts are formed of the coated strip by any conventional forming method, such as punching, stamping or the like. The electrical contact, consisting of a coated strip, may be oxidised before assembling the electrical component of which the electrical contact makes a part, or may be oxidised during operation.

DETAILED DESCRIPTION

Figure 1:
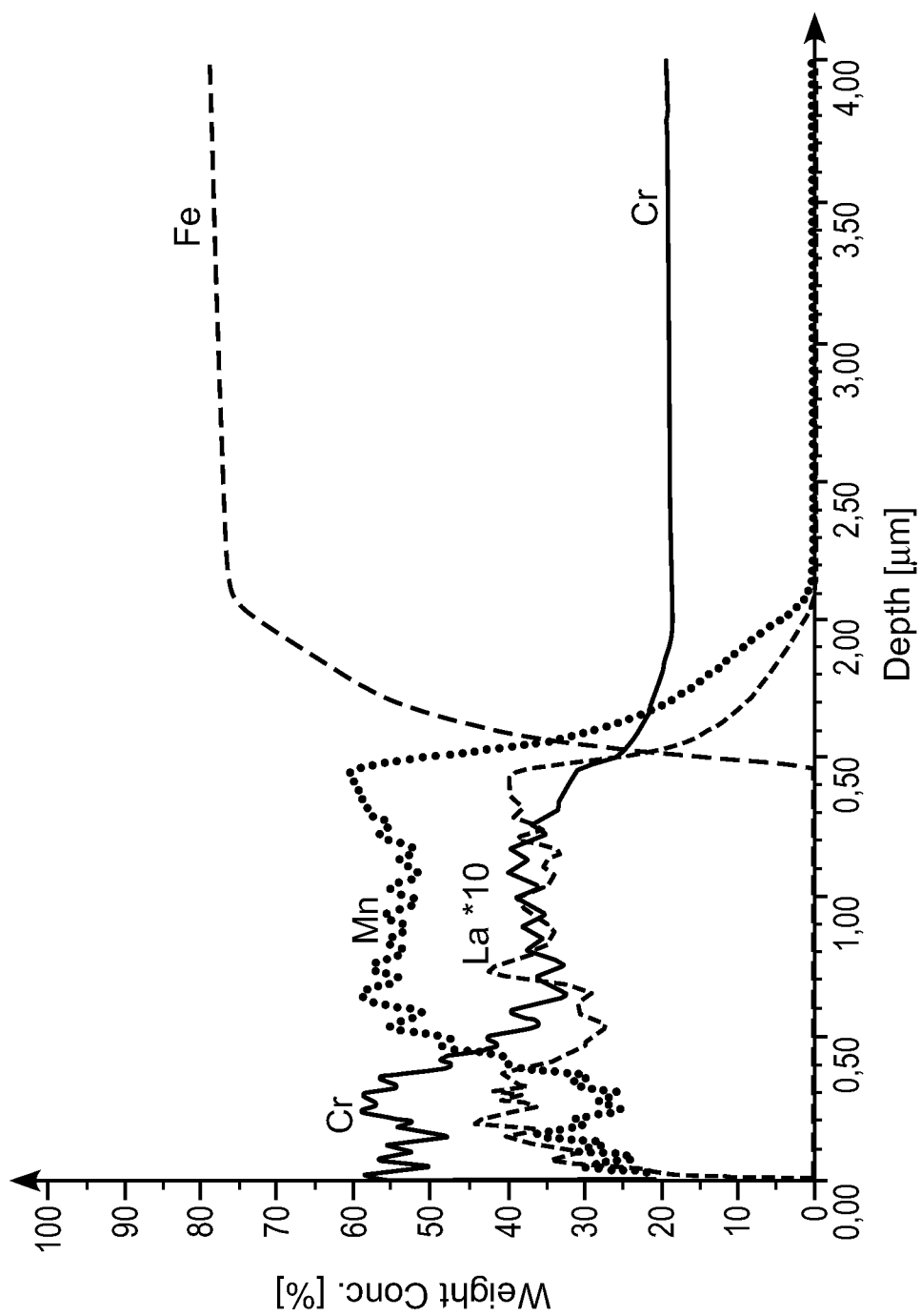
FIG. 1 GDOES analysis of a 1.5 µm thick CrM coating.

In the present disclosure the words "providing" and "provided" are to be considered meaning an intentional act and the result of an intentional act, respectively. Consequently, in this context a surface provided with a layer is intended to be a result of an active action.

A perovskite and/or a spinel structure can be formed on the surface instead of a "traditional" oxide on metal substrates used as electrical contacts. The purpose of the perovskite and/or spinel structure is to accomplish a surface with high electrical conductivity in order to have a surface with a low contact resistance. A coated strip material is produced by providing a metallic substrate, such as stainless steel, preferably ferritic chromium steel with a chromium content of 15-30% by weight. The strip material substrate is thereafter provided with a coating consisting of at least two separate layers. One layer is a metallic layer based Al, Cr, Co, Mo, Ni, Ta, W, Zr or an alloy based on any one of these elements, preferably Cr, Co, Ni, Mo or alloys based on any one of these elements. In this context "based on" means that the element/alloy constitutes the main component of the composition, preferably constitutes at least 50% by weight of the composition. The other layer is a reactive layer consisting of at least one element or compound, which forms a perovskite and/or a spinel structure with the element/elements of the metallic layer when oxidised. The precise composition of the coating can be tailor-made to achieve wanted properties, for example rate of oxide growth.

One reason for providing the surface with a coating comprising two separate layers, one being the metallic layer and the other being the reactive layer, is that a much more simplified production of the contact material is accomplished. However, the main reason for by providing a coating with two separate layers is that it is easier to control the amount of the different elements in the perovskite/spinel, i.e. tailor make the desired composition in order to achieve the desired result. Furthermore, an excellent adhesion of the coating to the substrate can be accomplished, thereby improving the properties of the contact material and hence improving the efficiency and prolonging the service life in the intended application.

The reactive layer may be located on either side of the layer of a metallic material; i.e. sandwiched between the substrate and the metallic layer or, on top of the first deposited metallic layer.

According to one preferred embodiment, the metallic material consists of essentially pure Cr or a Cr-based alloy. In this case, when the coating is oxidised a compound with a formula of $MCrO_3$ and/or $MCr_2O_4$ is formed, wherein M is any of the previously mentioned elements/compounds from the reactive layer. The reactive layer may contain elements from Group 2A or 3A of the periodic system, REM or transition metals. In this preferred embodiment the element M of the reactive layer preferably consists of any of the following elements: La, Y, Ce, Bi, Sr, Ba, Ca, Mg, Mn, Co, Ni, Fe or mixtures thereof, more preferably La, Y, Sr, Mn, Ni, Co and or mixtures thereof. One specific example of this embodiment is one layer of Cr and the other layer being Co.

The reactive layer is obtained by preoxidation of the surface of the metallic base material according to another preferred embodiment. In the case the metallic base material is a stainless steel, a chromium oxide will be formed. Thereafter a layer of Ni or Co is deposited on the formed oxide according to this embodiment.

The coating may also comprise further layers. For example, the coating may comprise a first metallic layer, thereafter a reactive layer and finally another metallic layer. This embodiment will further ensure a good conductivity of the surface of the electrical contact. However, due to economical reasons the coating does not comprise more than separate 10 layers, preferably not more than 5 separate layers.

The thickness of the different layers are usually less than 20 µm, preferably less than 10 µm, more preferably less than 5 µm, most preferably less than 1 µm. The thickness is preferably adapted to the requirements of the intended use of the electrical contact. According to one embodiment the thickness of the reactive layer is less than that of the metallic layer. This is especially important when the reactive layer comprises elements or compounds that upon oxidation themselves form non-conducting oxides. In this case it is important that essentially the whole reactive layer/layers are allowed to react and/or diffuse into the metallic layer at least during operation of the electrical contact, so that the conductivity of the contact during operation is not affected negatively.

The thickness of the strip substrate may be 5 mm or less, preferably less than 2 mm and most preferably less than 1 mm. The width of the strip may be up to 1200 mm, preferably at least 100 mm. Naturally, the thickness has to be adapted to the requirements of the final application of the electrical contact. One advantage of making a coated strip according to the present disclosure is that both small and large electrical contacts can be formed from the strip, for example by stamping or punching. This makes the manufacturing process more cost-effective. However, in some cases other forms of substrate might be applicable. One example where the substrate advantageously is in the form of a bar is in the application of support bars in electrochemical cells. The substrate may also be in form of a wire or tube if the intended use of the electrical contacts so requires.

The coated strip may be produced in a batch like process or continuous process. However, for economical reasons, the strip may be produced in lengths of at least 100 m, preferably at least 1 km, most preferably at least 5 km, in a continuous roll-to-roll process. The coating may be provided onto the substrate by coating with the metallic layer and the reactive layer. However, according to an alternative embodiment the coating may also be provided by pre-oxidation of the substrate to an oxide thickness of at least 50 nm and thereafter coating with the additional layer. The coating is thereafter oxidised further as to achieve the spinel and/or perovskite. This alternative embodiment of providing the coating onto the base material is especially applicable when the base material is ferritic chromium steel, such as the oxide formed on the surface is a chromium based oxide.

The coating may be performed with any coating process that generates a thin dense coating with good adhesion to the underlying material, i.e. the substrate or an underlying coating layer. Naturally, the surface of the strip has to be cleaned in a proper way before coating, for example to remove oil residues and/or the native oxide layer of the substrate. According to one preferred embodiment, the coating is performed by the usage of PVD technique in a continuous roll-to-roll process, preferably electron beam evaporation which might be reactive or even plasma activated if needed.

Furthermore, the strip may be provided with a coating on one side or on both sides. In the case the coating is provided on both surfaces of the strip, the composition of the different layers on each side of the strip may be the same but may also differ, depending on the application in which the electrical contact will operate. The strip may be coated on both sides simultaneously or one side at a time.

Optionally, the coated strip is exposed to an intermediate homogenisation step as to mix the separate layers and accomplish a homogenous coating. The homogenisation can be achieved by any conventional heat treatment under appropriate atmosphere, which could be vacuum or a reducing atmosphere, such as hydrogen or mixtures of hydrogen gas and inert gas, such as nitrogen, argon or helium.

The coated strip is thereafter oxidised at a temperature above room temperature, preferably above 100° C., more preferably above 300° C., so that a perovskite and/or a spinel structure is formed on the surface of the strip. Naturally, the coating thickness will increase when the coating is oxidised due to the spinel and/or perovskite formation. The oxidation may result in a total oxidation of the coating or a partially oxidation of the coating, depending on for example the thickness of the layers, if the coating is homogenised, and time and temperature of the oxidation. In either case, the different layers of the coating are allowed to at least partially react and/or diffuse into each other, if this is not done by an intermediate homogenisation step. The oxidation may be performed directly after coating, i.e. before the formation of the electrical contact, after formation to the shape of the final application, i.e. the manufacturing of the electrical contact from the coated strip, or after the electrical appliance, for example a fuel cell, has been assembled, i.e. during operation.

The purpose of accomplishing a perovskite and/or a spinel structure on the surface of the strip is that the formed perovskite and/or spinel has a much lower resistance compared to traditional oxides of the elements of the metallic layer. This will in turn lead to a lower contact resistance of the electrical contact and therefore also a better efficiency of the component of which the electrical contact makes a part. For example, the resistivity of $Cr_2O_3$ at 800° C. is about 7800 $\Omega \cdot cm$ while the resistivity of for example $La_{0.85}Sr_{0.15}CrO_3$ is several orders of magnitude lower, namely about 0.01 $\Omega \cdot cm$.

Also, in the case of chromium containing ternary oxides such as spinel and perovskites it is believe that these oxides are much less volatile than pure $Cr_2O_3$ at high temperatures.

Furthermore, by providing a perovskite and/or spinel structure on the surface of a substrate such as stainless steel the electrical contact will have good mechanical strength and is less expensive to manufacture than for example electrical contacts made entirely from a perovskite and/or spinel based ceramics.

Also, in the case where the substrate is a stainless steel the chromium depletion of the substrate is inhibited since the metallic layer will oxidise long before chromium of the substrate, this is especially pronounced when the metallic layer is Cr or a Cr-based alloy. Therefore, the corrosion resistance of the substrate will not be reduced during operation.

Moreover, according to one optional embodiment Mn and/or REM from the substrate is allowed to diffuse into the coating. This may in some cases further promote the formation of a perovskite or spinel structure on the surface. Even small contents of Mn and/or REM of the substrate may affect the formation of the final structure. The content of Mn in the substrate is preferably 0.1-5 wt %, the content of REM is preferably 0.01-3 wt % and the content of Cr in the substrate is preferably 15-30 wt %. Naturally, the needed content of Mn and/or REM depends on the thickness of the coating. Thicker coatings need higher contents of Mn and/or REM. For example, if the coating is less than 2 µm a content of 0.1-1 wt % Mn is sufficient as to achieve the desired result.

In some cases it might be applicable to have one surface of the electrical contact conductive while the other should be non-conductive, i.e. isolating. In these cases the coating as described previously may be applied to one surface and an electrically isolating material such as $Al_2O_3$ or $SiO_2$ may be applied to the other surface. This may be done in-line with the electrically conductive coating. According to one example a coating comprising one metallic layer and one reactive layer is provided to one surface of the strip and a metal which will form an insulating layer when oxidised, such as for example Al, is be applied to the other surface of the strip. The coated strip is thereafter oxidised resulting in one conductive surface and one insulating surface.

As an alternative to the above-described, one might apply the coating by other processes, for example by co-evaporation of the different components of the coating or by electrochemical processes.

Examples of coated strips will now be described. These should not be seen as limiting but merely of illustrative nature.

Example 1

A stainless steel substrate is coated with a coating consisting of a metallic layer and a reactive layer. The metallic layer is a Cr or a Cr-based alloy. The reactive layer in this case includes transition metals, such as Ni, Co, Mn and/or Fe, if the oxide should receive a spinel structure. If a perovskite structure is desired, the reactive layer contains elements from Group 2A or 3A of the periodic system, or REM. Preferably, the reactive layer contains Ba, Sr, Ca, Y, La and/or Ce. If a mixed structure including both a spinel and a perovskite structure, the reactive layer may contain elements from Group 2A or 3A of the periodic system, or REM along with transition metals. Alternatively, Mn and/or REM are allowed to diffuse from the substrate.

The coating is optionally homogenised and thereafter oxidised so as to form the desired structure on the surface. This results in a very low surface resistance of the strip substrate. Also, the Cr-oxides $MCrO_3$ and/or $MCr_2O_4$ formed during oxidation are less volatile than pure $Cr_2O_3$ at high temperatures. This results in a coated strip that is highly suitable to be used as contact material in corrosive environments even at high temperatures, for example as interconnects in Solid Oxide Fuel Cells.

Example 2

A 0.2 mm thick strip substrate of a ferritic chromium stainless steel was coated. The coating was homogenised so as to achieve a CrM layer wherein M is a mixture of La and Mn. The concentration of Cr in the coating is approximately 35-55 wt %, while the concentration of Mn is approximately 30-60 wt % and the concentration of La is 3-4 wt %.

The surface was analysed by Glow Discharge Optical Emission Spectroscopy (GDOES). Using this technique, it is possible to study the chemical composition of the surface layer as a function of the distance from the surface. The method is very sensitive for small differences in concentration and has a depth resolution of a few nanometers. The result of the GDOES analysis of a 1.5 µm thick CrM surface alloying layer is shown in FIG. 1.

Example 3

Figure 2:
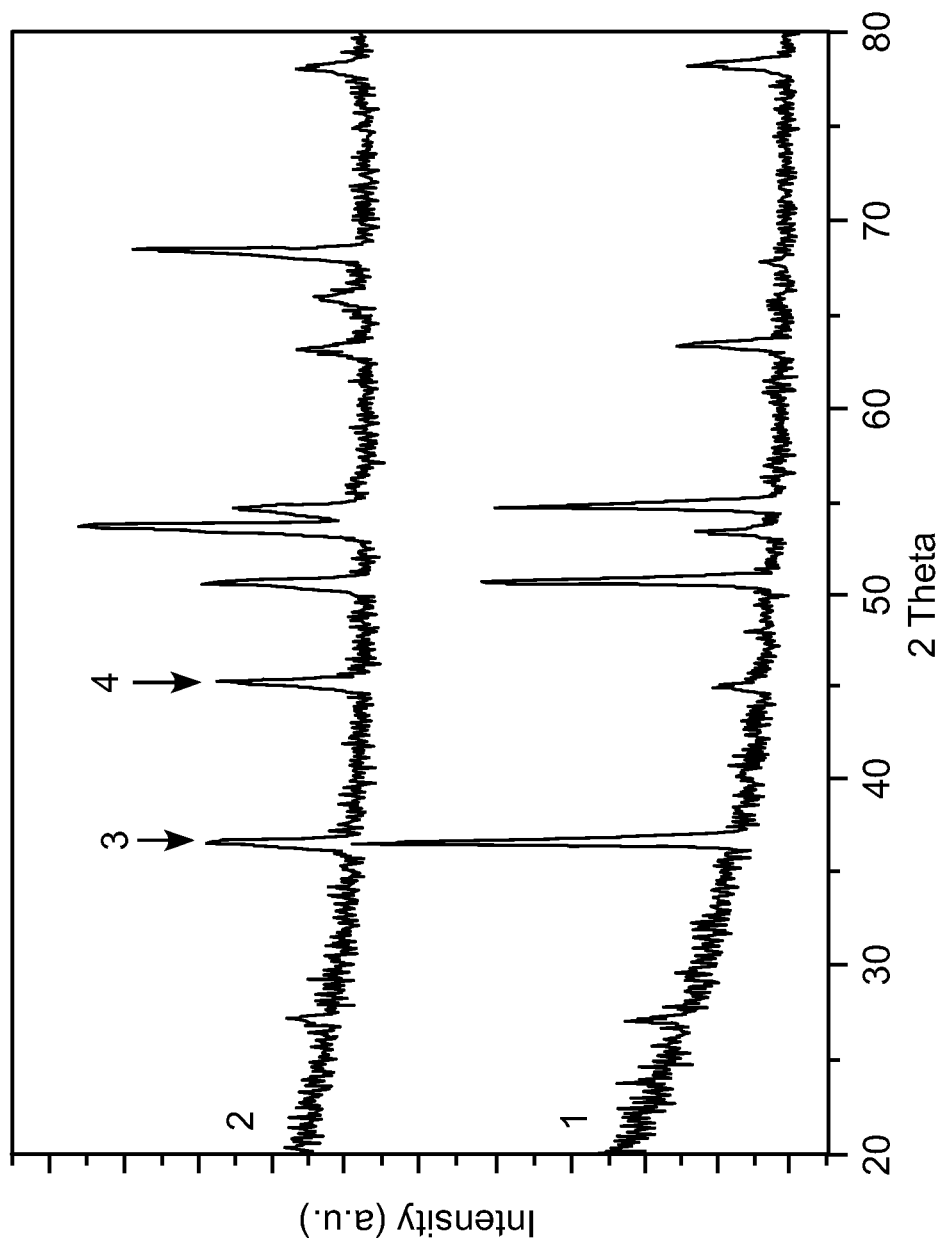
FIG. 2 GIXRD diffractogram of oxidised samples with and without coating.

Two samples of a ferritic chromium steel with the nominal composition, by weight max 0.050% C; max 0.25% Si; max 0.35% Mn; 21-23% Cr; max 0.40% Ni; 0.80-1.2% Mo; max 0.01% Al; 0.60-0.90% Nb; small additions of V, Ti and Zr and natural occurring impurities were manufactured. One of the samples was coated with a 0.1 µm thick cobalt layer and a 0.3 µm thick chromium layer. The samples were oxidised in air at 850° C. for 168 hours prior to the analysis. The samples were analysed by Grazing Incidence X-Ray Diffraction (GIXRD) with an incidence angle of 0.5°, see FIG. 2. It should be pointed out that GIXRD is a surface sensitive diffraction method and only the crystalline phase of the top layer on the oxidised steel is analysed. Any crystalline phase present under the top layer which is not reached by the grazing X-rays will not be seen in the diffractogram. The amount of spinel vs. chromium oxide formed in the top layer of the oxide scale of each sample were compared by measuring the peak to bottom intensity of the $Cr_2O_3$ (Eskolaite) reflection at 2 theta=36.7° (3) and dividing it by the intensity of the spinel reflection at 2 theta=45° (4). The ratio of Eskolaite/spinel for the uncoated oxidised samples was 9.9 while for the coated sample the ratio was 1.0. This could be interpreted as a ten-fold increase of spinel structure in the surface oxide scale formed. In FIG. 2 the (1) diffractogram is the uncoated sample oxidised in air for 168 hours at 850° C. and the (2) diffractogram is the coated sample oxidised in air for 168 hours at 850° C.

Example 4

Figure 3:
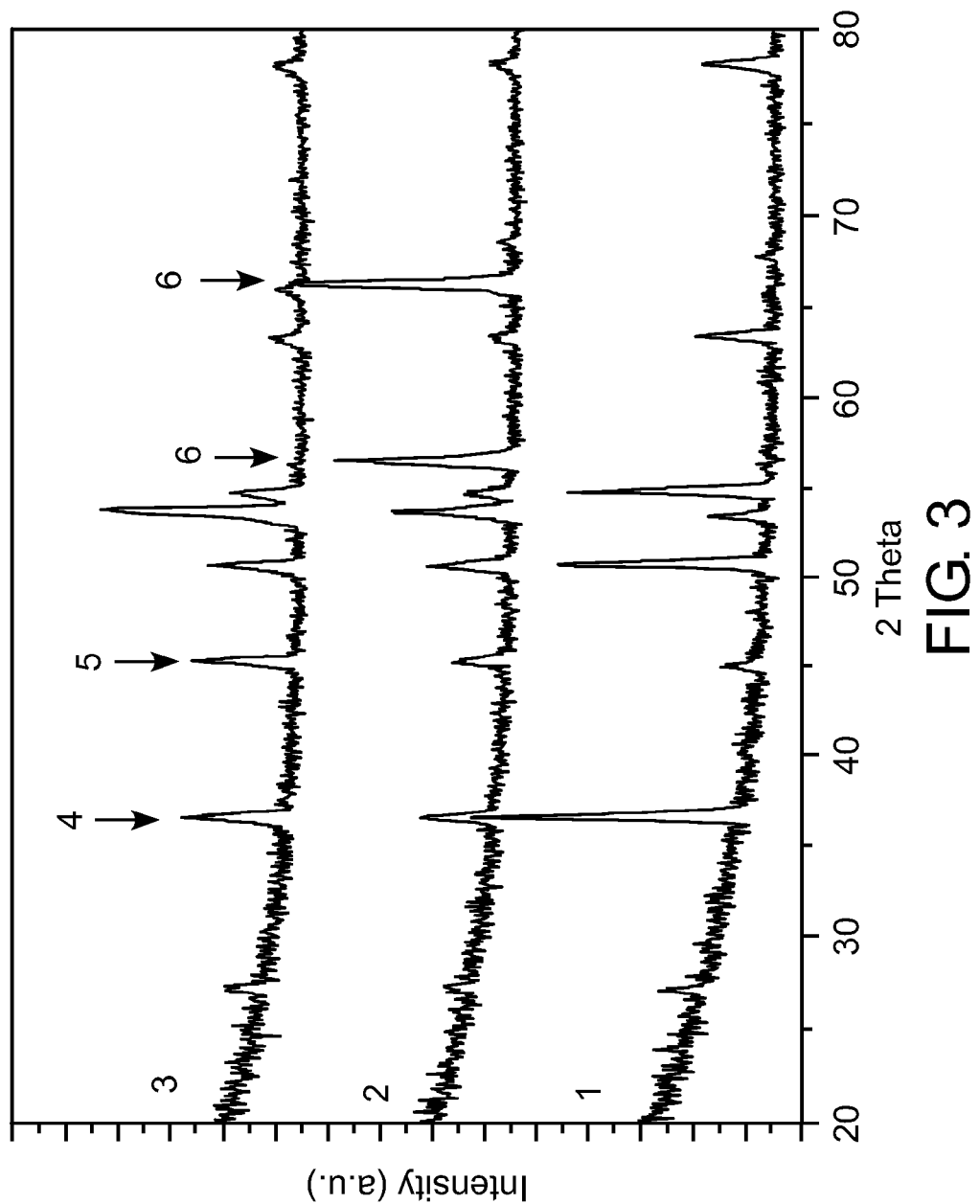
FIG. 3 GIXRD diffractogram of pre-oxidised samples with and without metallic layer.

Three samples of a ferritic chromium steel with the nominal composition, by weight max 0.050% C; max 0.25% Si; max 0.35% Mn; 21-23% Cr; max 0.40% Ni; 0.80-1.2% Mo; max 0.01% Al; 0.60-0.90% Nb; small addition of V, Ti and Zr and normally occurring impurities were manufactured. Two of the samples were pre-oxidised in air to get a 100 nm thick oxide scale. The pre-oxidised samples were thereafter coated with a metallic layer. The metallic layer on sample 2 was a 300 nm thick Ni layer and on sample 3 a 300 nm thick Co layer. All three samples were then further oxidised in air at 850° C. for 168 hours prior to the analysis. The samples were analysed by Grazing Incidence X-Ray Diffraction (GIXRD) with an incidence angle of 0.5°, see FIG. 3. It should be pointed out that GIXRD is a surface sensitive diffraction method and only the crystalline phase of the top layer on the oxidised steel is analysed. Any crystalline phase present under the top layer which is not reached by the grazing X-rays will not be seen in the diffractogram. The amount of spinel vs. chromium oxide formed in the top layer of the oxide scale of each sample were compared by measuring the peak to bottom intensity of the $Cr_2O_3$ (Eskolaite) reflection at 2 theta=36.7°. (4) and dividing it by the intensity of the spinel $MCr_2O_4$ reflection at 2 theta=45°. (5). The ratio of $Cr_2O_3/MCr_2O_4$ for the uncoated oxidised samples was 9.9 while for the pre-oxidised sample with the Ni layer the ratio was 1.26 and for the pre-oxidised sample with the Co layer the ratio was 0.98. This indicating an 8.5, respective 10 folded increase of spinel structure in the formed oxide scale. Interesting to note here is that the nickel layer does not only form more spinel oxide in the scale but also NiO is formed when the sample has been oxidised (6). In FIG. 3 the (1) diffractogram is the uncoated sample oxidised in air for 168 hours at 850° C., the (2) diffractogram is the pre-oxidised sample with a Ni layer sample oxidised in air for 168 hours at 850° C. and the (3) diffractogram is the pre-oxidised sample with a Co layer sample oxidised in air for 168 hours at 850° C.

What is claimed is:

1. Strip product to be used as electrical contact consisting of a stainless steel base material and a coating provided on the stainless steel base material, wherein the coating comprises at least one metallic layer, and at least one reactive layer which forms a spinel and/or perovskite structure with the at least one metallic layer when oxidised, wherein a total thickness of the at least one reactive layer is less than a total thickness of the at least one metallic layer, wherein a composition of the at least one metallic layer includes Co or a Co-based alloy, and wherein a composition of the at least one reactive layer includes Ce or a Ce-based alloy, wherein the at least one reactive layer is located between the at least one metallic layer and the stainless steel base material.

2. Strip product according to claim 1, wherein each of the layers is less than 20 µm thick.

3. Strip product according to claim 1, wherein the composition of the stainless steel base material comprises Mn in an amount of 0.1-5% by weight and/or REM in an amount of 0.01-3% by weight.

4. Strip product according to claim 1, wherein the at least one metallic layer comprises at least two separate metallic layers in addition to the at least one reactive layer.

5. Strip product according to claim 4, wherein a composition of each of the at least two separate metallic layers includes Co or the Co-based alloy.

6. Strip product according to claim 1, wherein the coating consists of one metallic layer and one reactive layer.

7. Strip product according to claim 1, wherein a total number of the at least one reactive layer and the at least one metallic layer in the coating is no more than 10.

8. Strip product according to claim 7, wherein the total number of the at least one reactive layer and the at least one metallic layer in the coating is no more than 5.

9. Strip product to be used as electrical contact consisting of:
a stainless steel base material; and
a coating provided on the stainless steel base material,
wherein the coating comprises at least one metallic layer of Co or a Co-based alloy, and at least one reactive layer containing at least one element or compound which forms a spinel and/or perovskite structure with the Co or a Co-based alloy of the at least one metallic layer of Co or a Co-based alloy when oxidized,
wherein the at least one element or compound which forms a spinel and/or perovskite structure is Ce or a Ce-based alloy,
wherein a thickness of the at least one reactive layer is less than a thickness of the at least one metallic layer,
wherein each of the at least one reactive layer and the at least one metallic layer is less than 1 µm thick, and
wherein the at least one reactive layer is located between the at least one metallic layer and the stainless steel base material.

10. Strip product according to claim 9, wherein each of the layers is less than 20 µm thick.

11. Strip product according to claim 9, wherein the at least one metallic layer comprises at least two separate metallic layers in addition to the at least one reactive layer.

12. Strip product according to claim 9, wherein the composition of the stainless steel base material comprises Mn in an amount of 0.1-5% by weight and/or REM in an amount of 0.01-3% by weight.

13. Strip product according to claim 9, wherein the coating consists of one metallic layer and one reactive layer.

14. Strip product according to claim 9, wherein a total number of the at least one reactive layer and the at least one metallic layer in the coating is no more than 10.

15. Strip product according to claim 14, wherein the total number of the at least one reactive layer and the at least one metallic layer in the coating is no more than 5.

16. Strip product to be used as electrical contact consisting of a stainless steel base material and a coating provided on the stainless steel base material,
wherein the coating comprises at least one metallic layer, and at least one reactive layer which forms a spinel and/or perovskite structure with the at least one metallic layer when oxidised,
wherein a total thickness of the at least one reactive layer is less than a total thickness of the at least one metallic layer,
wherein a composition of the at least one metallic layer consists of Co or a Co-based alloy, and
wherein a composition of the at least one reactive layer consists of Ce or a Ce-based alloy,
wherein the at least one reactive layer is located between the at least one metallic layer and the stainless steel base material.

17. Strip product to be used as electrical contact consisting of a stainless steel base material and a coating provided on the stainless steel base material,
wherein the coating comprises at least one metallic layer, and at least one reactive layer which forms a spinel and/or perovskite structure with the at least one metallic layer when oxidised,
wherein a total thickness of the at least one reactive layer is less than a total thickness of the at least one metallic layer,
wherein a composition of the at least one metallic layer includes Co or a Co-based alloy,
wherein a composition of the at least one reactive layer includes Ce or a mixture of Ce and one or more of La, Y, Bi, Sr, Ba, Ca, Mg, Mn, Co, Ni, and Fe, and
wherein the at least one reactive layer is located between the at least one metallic layer and the stainless steel base material.

18. Strip product to be used as electrical contact consisting of:
a stainless steel base material; and
a coating provided on the stainless steel base material,
wherein the coating comprises at least one metallic layer of Co or a Co-based alloy, and at least one reactive layer containing at least one element or compound which forms a spinel and/or perovskite structure with the Co or a Co-based alloy of the at least one metallic layer of Co or a Co-based alloy when oxidized,
wherein the at least one element or compound which forms a spinel and/or perovskite structure is Ce or a mixture of Ce and one or more of La, Y, Bi, Sr, Ba, Ca, Mg, Mn, Co, Ni, and Fe,
wherein a thickness of the at least one reactive layer is less than a thickness of the at least one metallic layer,
wherein each of the at least one reactive layer and the at least one metallic layer is less than 1 µm thick, and
wherein the at least one reactive layer is located between the at least one metallic layer and the stainless steel base material.

19. Strip product to be used as electrical contact consisting of a stainless steel base material and a coating provided on the stainless steel base material, wherein the coating comprises at least one metallic layer, and at least one reactive layer which forms a spinel and/or perovskite structure with the at least one metallic layer when oxidised,
wherein a total thickness of the at least one reactive layer is less than a total thickness of the at least one metallic layer,
wherein a composition of the at least one metallic layer consists of Co or a Co-based alloy,
wherein a composition of the at least one reactive layer consists of Ce or a mixture of Ce and one or more of La, Y, Bi, Sr, Ba, Ca, Mg, Mn, Co, Ni, and Fe, and
wherein the at least one reactive layer is located between the at least one metallic layer and the stainless steel base material.

* * * * *